US006174392B1

(12) United States Patent
Reis

(10) Patent No.: US 6,174,392 B1
(45) Date of Patent: Jan. 16, 2001

(54) COMPOSITE STRUCTURE REPAIR PROCESS

(75) Inventor: Carl Andrew Reis, Torrance, CA (US)

(73) Assignee: Northrop Grumman Corporation, Los Angeles, CA (US)

(*) Notice: Under 35 U.S.C. 154(b), the term of this patent shall be extended for 0 days.

(21) Appl. No.: 09/262,807

(22) Filed: Mar. 4, 1999

(51) Int. Cl.$^7$ ..................................................... B32B 35/00
(52) U.S. Cl. ............................... 156/58; 156/64; 156/98; 356/2; 382/285; 382/286; 382/302
(58) Field of Search .................................. 156/58, 64, 94, 156/98; 356/2; 382/154, 285, 286, 302; 702/166, 167, 171

(56) References Cited

U.S. PATENT DOCUMENTS

| | | | |
|---|---|---|---|
| 4,399,965 | 8/1983 | Walker | 244/129.4 |
| 4,525,858 | 7/1985 | Cline et al. | 382/1 |
| 4,736,436 | 4/1988 | Yasukawa et al. | 382/16 |
| 4,828,384 | 5/1989 | Plankenhorn et al. | 356/121 |
| 5,067,167 | 11/1991 | Berger | 382/46 |
| 5,212,738 | 5/1993 | Chande et al. | 382/8 |
| 5,369,736 | 11/1994 | Kato et al. | 395/125 |
| 5,406,367 | 4/1995 | Sopori | 356/30 |
| 5,418,608 | 5/1995 | Caimi et al. | 356/3.01 |
| 5,424,105 | 6/1995 | Stewart | 428/40 |
| 5,514,232 * | 5/1996 | Burns | 156/64 |
| 5,522,402 | 6/1996 | Cooley | 128/782 |
| 5,539,652 | 7/1996 | Tegethoff | 364/490 |
| 5,561,526 | 10/1996 | Huber et al. | 356/376 |

OTHER PUBLICATIONS

Argard. The Repair of Aircraft Structures Involving Composite Materials. Specialised Printing Services Limited. Loughton, Essex, Oct. 1986.*

* cited by examiner

*Primary Examiner*—Michael W. Ball
*Assistant Examiner*—Gladys Piazza
(74) *Attorney, Agent, or Firm*—Terry J. Anderson; Karl J. Hoch, Jr.

(57) ABSTRACT

A method for repairing a multi-layered damage area in a multi-layered composite structure. The method first includes obtaining depth measurement data, and obtaining topographical measurement data by laser scanning the surface of the damage area. This depth measurement data and topographical measurement data are inputted into a microprocessor along with thickness data of each layer. All inputted information is correlated among itself to thereby internally produce a three-dimensional damage area display-replica and interpolate a two-dimensional pattern of each layer of the damage area and of the surface of the damage area. The damage area is removed by first projecting a two-dimensional laser pattern of the damage area thereat on the surface of the structure, and thereafter manually removing the area to produce a void. Repair is accomplished by projecting onto respective replacement material a two-dimensional laser image pattern of each layer and manually cutting that layer according to the appropriate pattern. The cut layers then are arranged in accord with construction of the removed damage area to form a plug that is placed within the void.

6 Claims, 3 Drawing Sheets

COMPOSITE STRUCTURE REPAIR PROCESS

FIELD OF THE INVENTION

The present invention relates generally to the art of repairing damaged structure, and more particularly to a novel process for determining and repairing damage to a composite layered structure.

BACKGROUND OF THE INVENTION

The use of composite multi-layered materials exhibiting high strength to weight ratios and capable of extended service is particularly exemplified in aircraft construction where composite multi-layered component structures can be compositionally and geometrically tailored to function in substantially all environments encountered during flight. Because of these extreme environmental conditions, however, it is common for damage to occur to such composite structures. As can be appreciated, repairing these multi-layered structures must be such that a repaired portion fully and completely corresponds in integrity to values present prior to the occurrence of the damage. Otherwise, structural failure may occur at the site of repair during operation of an aircraft bearing the repaired composite structure, and such failure may result in loss of life and property.

Present repair methodology for a multi-layered composite structure generally involves, first, locating the damaged area, second, manually marking and removing the damaged area without significant external aid in the topographical measurement and demarcation of the damaged structural portion to be removed, and, third, manually designing and fabricating each replacement layer of a patch destined to replace the removed damaged area, once again without significant external aid in the replication of original structural topographical orientation. In addition to being extremely tedious, labor-intensive and time-consuming work, such present methodology requires significant operator expertise and, consequently, can be subject to significant operator error. As noted above, an error in the repair of a composite structure can lead to potentially critical circumstances. Thus, it is evident that a need is present for provision of operator aid in the repair of multi-layer composite structures.

Accordingly, a primary object of the present invention is to provide a process for repairing damage to a multi-layer composite structure wherein topographical laser measurement of a damaged area is correlated with damage-depth measurement and known component presence to map damaged-area parameters for ultimate removal.

Another object of the present invention is to provide a process for repairing damage to a multi-layer composite structure wherein a microprocessor correlates laser topographical measurement with inputted depth measurement to create a laser pattern projected on the damaged area to be followed in removing damaged material.

Yet another object of the present invention is to provide a process for repairing damage to a multi-layer composite structure wherein a microprocessor topographical and depth correlation is provided to generate projection of a laser pattern on a flat piece of replacement material to enable an operator to cut a replacement patch whose placement replicates substantially all characteristics of the composite structure prior to damage.

These and other objects of the invention will become apparent throughout the description thereof which now follows.

SUMMARY OF THE INVENTION

The present invention is a method for repairing a multi-layered damage area in a multi-layered composite structure where the damage area has a width dimension and a depth dimension and is disposed on a surface of the structure. The method first comprises measuring the depth dimension of the damage area to obtain depth measurement data, and laser scanning the surface of the structure to obtain topographical measurement data of the damage area. This depth measurement data and topographical measurement data are inputted into a microprocessor along with thickness data of each layer and, optionally, locations of any adjacent non-damage area structures that could be damaged during removal of damage area if care is not exercised. All of this information is correlated among itself by the microprocessor to thereby internally produce a three-dimensional display-replica of the damage area and interpolate a two-dimensional pattern of each layer of the damage area and of the surface of the damage area.

The damage area is removed by first projecting by laser a two-dimensional pattern of the damage area thereat on the surface of the structure, and thereafter manually removing the area to produce a void in accord with the projected pattern which includes any non-damaged material above or beneath width expanses of the damage area. Repair of the structure is accomplished by projecting onto respective replacement material a two-dimensional laser image pattern of each layer of the damage area and manually cutting each layer according to the appropriate pattern. The cut layers then are arranged in accord with construction of the removed damage area (e.g. size, shape, orientation of warp direction, etc.) to form a plug that is placed within the void to thereby replace all earlier-removed material. In this manner, accurately constructed and positioned multi-layer composite structure repair is effectuated to equal the construction of the removed damage area and thereby restore strength, durability, and maintainability to the structure.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENTS

Figure 1:
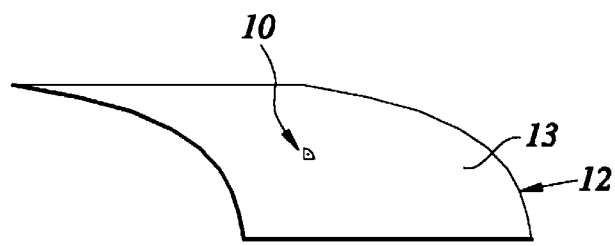
FIG. 1 is a schematic perspective view of the surface of a damaged multi-layered composite structure.
Figure 2:
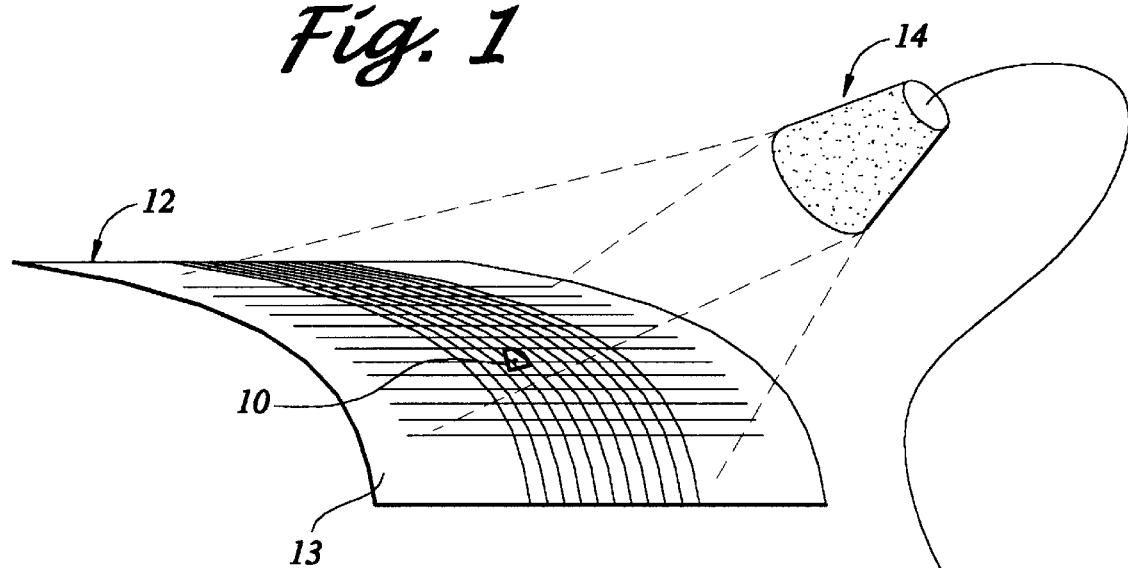
FIG. 2 is a schematic perspective view of a laser-scanned surface topography of the damaged multi-layered composite structure of FIG. 1, and a schematic front view of a microprocessor for storage and recall of laser-scanned surface dimensions and inputted depth dimensions of a damaged area.
Figure 2:
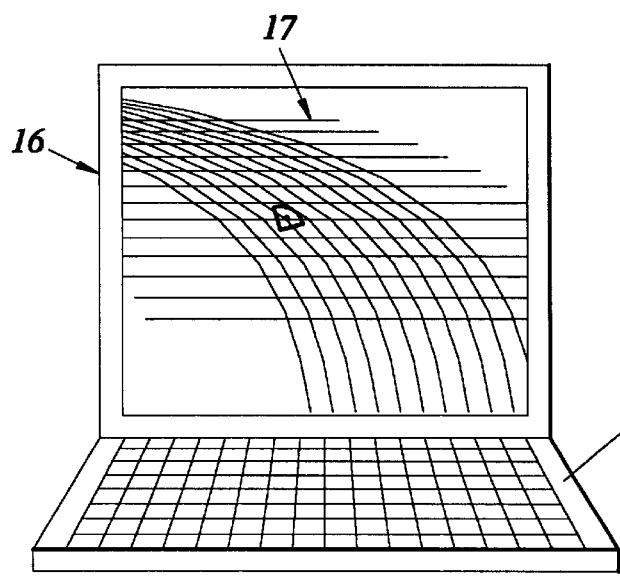
Figure 3:
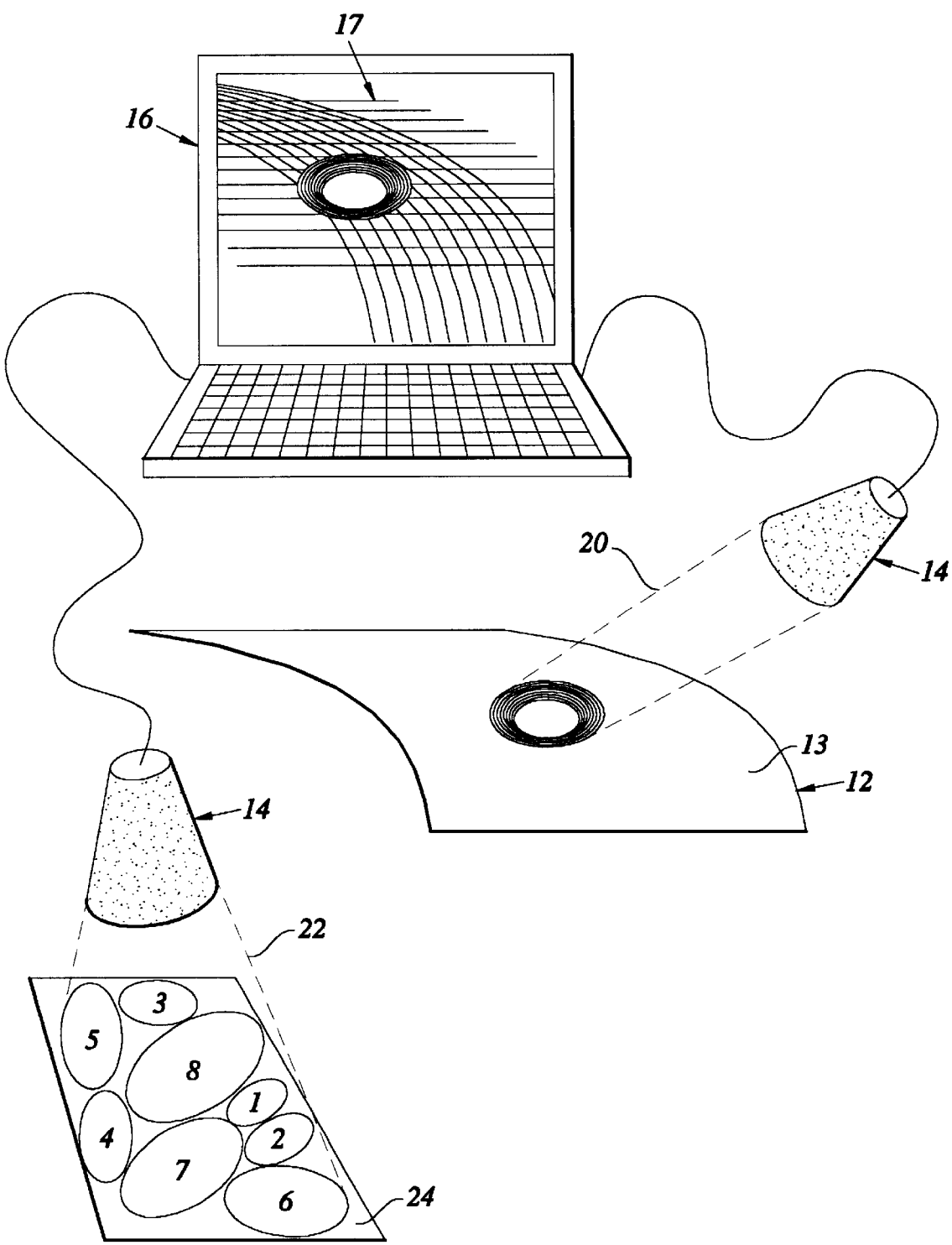
FIG. 3 is a schematic front view of the microprocessor having processed the surface and depth dimensions of a damaged area, a schematic perspective view of a laser projecting a two-dimensional pattern onto the damaged area of the multi-layered structure to aid an operator in removing damaged material by using the pattern as a cutting guide, and a schematic perspective view of a laser projecting a two-dimensional pattern onto a replacement material to aid an operator by using the pattern as a cutting guide in preparing a patch.

Referring now to the drawings, and particularly to FIGS. 1–3, the present methodology for repairing damage to a multi-layered composite structure 12 begins with a depth analysis, non-limitedly performable by ultrasound analysis as known in the art, of a damaged area 10 of the structure 12 and inputting depth data so collected to a microprocessor 16 for subsequent correlation with damage data. A standard laser 14, either spaced from the damaged structure 12 or conventionally attached to the structure 12, measures the surface topography such as the curvature of the structure 12 at the site of damage and its surrounding vicinity, and the information so gathered is likewise inputted to the microprocessor 16 for correlative consideration of depth dimensioning earlier inputted. Also inputted are data concerning other structures (not shown) near the damaged area 10, non-limitedly exemplified as conduits, braces, etc. potentially located immediately behind the damaged area 10, that must be avoided during any repair procedure. Finally, data identifying the physical makeup of the structure 12, such as the number and thicknesses of the layers thereof, product specifications thereof, and the like, are inputted. All of this data relative to surface topography, depth, nearby structure avoidance, and physical makeup are processed to yield a three-dimensional display-replica 17 of the damaged area 10 and vicinity including data regarding each layer of the structure 12.

In order to accomplish removal of the damaged area 10, the microprocessor 16 interpolates the three-dimensional display-replica 17 into a laser pattern 20 for two-dimensional projection onto the surface 13 of the damaged area 10 as shown in FIG. 3 to prescribe material removal dimensions to be followed by an operator. Appropriate orientation of the laser pattern 20 on the surface 13 can be accomplished as known in the art by placing a laser-reference frame (not shown) around the damaged area 10 such that the laser 14 automatically aligns with standard reference marks of the frame and thereby aligns proper laser pattern orientation. The pattern itself is derived from the above-described collected data of surface topography, structure thickness, number of layers and type of material, and adjacent-structure presence whose contact must be avoided. Thus, resultant removal dimensions may be in the shape of a circle, an oval (as shown), a rectangle, etc., depending upon consideration of all factors provided by collected data. Advantageously, the pattern so derived and projected on the surface 13 functions to prevent unnecessary and possibly harmful structure destruction that occurs as a damaged area 10 is removed. Preferably, the laser 14 is spaced from the surface 13 while projecting the pattern thereon such that an operator can move between the laser 14 and the surface 13 to thereby facilitate manual removal of the damaged area 10.

After manual removal of the damaged area 10, the microprocessor 16 functions to determine the configuration of a plug 25 of replacement material 24. Such design takes into account materials to be used, number and thickness of layers to be replaced, orientation of the layers, scarf ratio, and the shape of the repair. In particular, data for each layer of replacement material is interpolated to generate a two-dimensional laser flat pattern 22 from the three-dimensional laser display-replica pattern 20. The laser 14 projects the laser flat pattern 22 of each layer onto a replacement material 24 to identify the size, shape, and orientation of warp direction of that layer for ultimate creation of the plug 25 of replacement material 24. This projected laser pattern provides the guide for an operator as the operator manually cuts each layer from replacement material 24 for plug fabrication as respective layers are stacked and secured in proper orientation. General plug configuration, and thus the con-efiguration of removed damage area, preferably is based upon depth of each replacement layer, with width to depth thereof being a ratio of 20:1. FIG. 3 defines all layers of a replacement plug as being of the same material and therefore cut from the same piece of material 24. The numerals 1–8 within illustrated oval patterns represent eight layers forming the structure 12.

Figure 4:
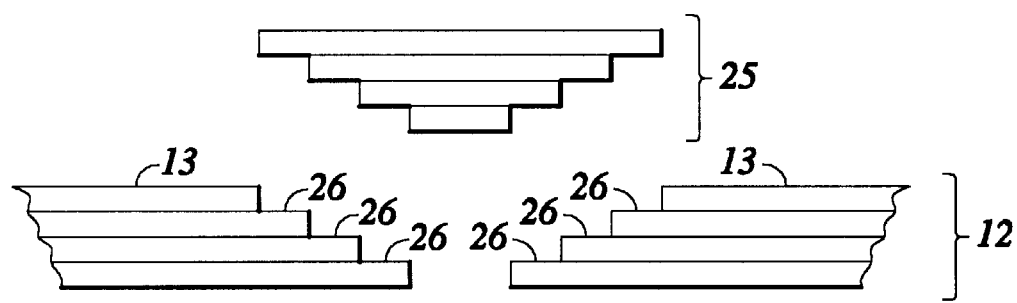
FIG. 4 is a schematic cross sectional view of a first exemplified multi-layered structure and first plug of replacement material for placement within the void of the structure.
Figure 5A:
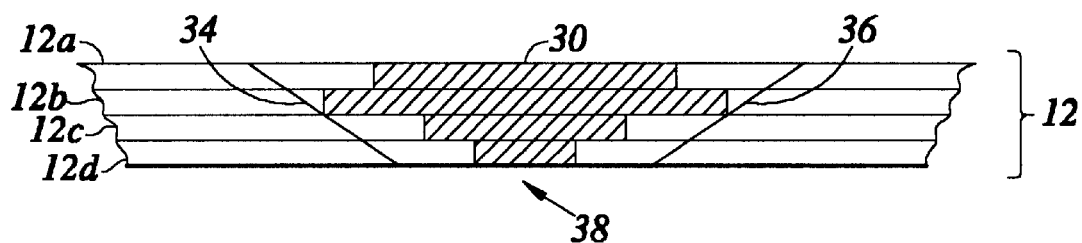
FIG. 5a is a schematic cross sectional view of a second exemplified damage pattern with a smooth-edge cone-shaped cutting pattern.
Figure 5B:
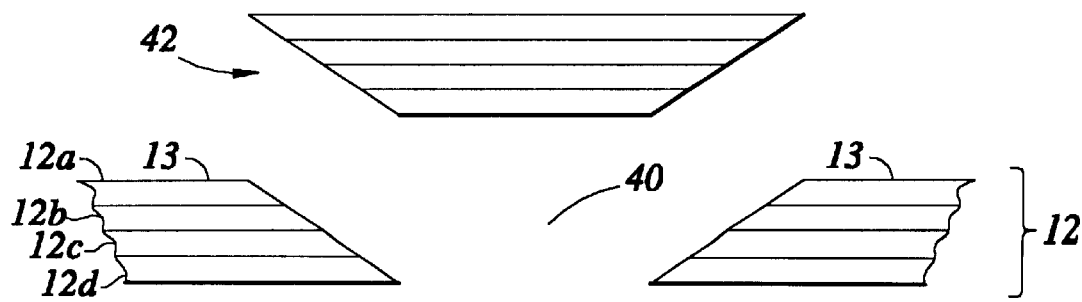
FIG. 5b is a schematic cross sectional view of the structure of FIG. 5a with a smooth-edge cone-shaped plug of replacement material for placement within the void thereof.

FIG. 4 illustrates a replacement plug 25 with a stepped side to fit against complimentary steps 26 of the wall defining damage-area void, while FIGS. 5a and 5b illustrate a more common smooth-sided replacement plug 42. Thus, FIG. 4 illustrates structure damage where the damage is relatively symmetrically cone-shaped and does not extend laterally into non-damaged surrounding structure layers at an intermediate vertical depth. FIGS. 5a and 5b illustrate replacement dimensioning wherein the structure 12 of FIG. 5a has damage at varying lateral projections, with the area removed situated between lines 34 and 36 such that a cone-shaped section 38 is removed to produce a cone-shaped void 40 shown in FIG. 5b which accommodates a cone-shaped plug 42 of replacement material. The interfacing angular surfaces of the void 40 and the plug 42 provide proper seating of the plug 42 with complimentary outer bonding surfaces. As earlier related, each layer 12a, 12b, 12c, 12d of the damaged area 10 is replaced by the plug 42 having corresponding replacement layers each of which is manually cut from a two-dimensional laser pattern projected on layer materials to match the construction of removed structure and thereby accomplish strength, durability, and maintainability of repaired structure as being equivalent to that of new structure.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for repairing a multi-layered damage area in a multi-layered composite structure, said damage area having a surface, a width dimension and a depth dimension and disposed on a surface of the composite structure, the method comprising:

a) measuring the depth dimension of the damage area to obtain depth measurement data;

b) scanning the surface of the composite structure with a laser to obtain topographical measurement data of the damage area;

c) inputting into a microprocessor for correlation there among thickness data of each layer of the damage area, said depth measurement data, and said topographical measurement data to thereby produce a three-dimensional display-replica of the damage area and interpolate a two-dimensional pattern of each layer of the damage area and of the surface of the damage area;

d) projecting by laser a two-dimensional pattern of the damage area at the damage area on the surface of the structure;

e) manually removing from the structure the damage area and any non-damaged material above or beneath the damage area and whose width resides within a maximum width of the damage area to thereby produce both a void in accord with the pattern projected thereon and a removed damage area;

f) projecting onto respective replacement material a two-dimensional laser image pattern of each layer of the damage area, manually cutting each layer according to the pattern, arranging layers so cut in accordance with construction of the removed damage area to form a plug, and placing said plug within the void to thereby replace the damage area.

2. A method for repairing a multi-layered damage area in a multi-layered composite structure as claimed in claim 1 wherein location data of non-damage area structures adjacent the damage area is additionally inputted into the microprocessor.

3. A method for repairing a multi-layered damage area in a multi-layered composite structure as claimed in claim 1 wherein said depth dimension is measured ultrasonically.

4. A method for repairing a multi-layered damage area in a multi-layered composite structure as claimed in claim 1 wherein in step (d) thereof the laser is spaced from the composite structure when projecting a two-dimensional pattern of the damage area.

5. A method for repairing a multi-layered damage area in a multi-layered composite structure as claimed in claim 1 wherein the removed damage area and the plug each has a width dimension to depth dimension relationship constant.

6. A method for repairing a multi-layered damage area in a multi-layered composite structure as claimed in claim 5 wherein the width dimension to depth dimension relationship constant of both the removed-damage area and the plug is 20:1.

* * * * *